(12) United States Patent
Miwa et al.

(10) Patent No.: US 9,711,292 B2
(45) Date of Patent: Jul. 18, 2017

(54) METHOD OF MANUFACTURING POSITIVE ELECTRODE ACTIVE MATERIAL FOR LITHIUM ION BATTERY

(71) Applicant: SEMICONDUCTOR ENERGY LABORATORY CO., LTD., Atsugi-shi, Kanagawa-ken (JP)

(72) Inventors: Takuya Miwa, Kanagawa (JP); Kuniharu Nomoto, Saitama (JP); Nobuhiro Inoue, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 294 days.

(21) Appl. No.: 14/178,535

(22) Filed: Feb. 12, 2014

(65) Prior Publication Data

US 2014/0166946 A1 Jun. 19, 2014

Related U.S. Application Data

(63) Continuation of application No. 13/923,428, filed on Jun. 21, 2013, and a continuation of application No. (Continued)

(30) Foreign Application Priority Data

Aug. 29, 2011 (JP) .................. 2011-186340

(51) Int. Cl.
  *H01G 9/042* (2006.01)
  *H01M 4/58* (2010.01)
  (Continued)

(52) U.S. Cl.
  CPC .......... *H01G 9/042* (2013.01); *H01M 4/5825* (2013.01); *H01M 4/625* (2013.01); (Continued)

(58) Field of Classification Search
  CPC .... H01G 9/042; H01M 4/5825; H01M 4/622; H01M 4/625; H01M 10/04
  See application file for complete search history.

(56) References Cited

U.S. PATENT DOCUMENTS 5,474,861 A   12/1995  Bito et al.
7,179,561 B2   2/2007  Niu et al.
(Continued)

FOREIGN PATENT DOCUMENTS

CN   101777648 A    7/2010
CN   101916859     12/2010
(Continued)

OTHER PUBLICATIONS

Chinese Office Action (Application No. 201280041901.4) Dated Sep. 25, 2015.
(Continued)

*Primary Examiner* — Helen O Conley
(74) *Attorney, Agent, or Firm* — Nixon Peabody LLP; Jeffrey L. Costellia

(57) ABSTRACT

At least one of an aqueous solution A containing lithium, an aqueous solution B containing iron, manganese, cobalt, or nickel, and an aqueous solution C containing a phosphoric acid includes graphene oxide. The aqueous solution A is dripped into the aqueous solution C, so that a mixed solution E including a precipitate D is prepared. The mixed solution E is dripped into the aqueous solution B, so that a mixed solution G including a precipitate F is prepared. The mixed solution G is subjected to heat treatment in a pressurized atmosphere, so that a mixed solution H is prepared, and the mixed solution H is then filtered. Thus, particles of a compound containing lithium and oxygen which have a small size are obtained.

18 Claims, 8 Drawing Sheets

Related U.S. Application Data

13/595,024, filed on Aug. 27, 2012, now Pat. No. 8,470,477.

(51) Int. Cl.
  *H01M 10/04* (2006.01)
  *H01M 4/62* (2006.01)
  *B82Y 30/00* (2011.01)

(52) U.S. Cl.
  CPC ............ *H01M 10/04* (2013.01); *B82Y 30/00* (2013.01); *H01M 4/622* (2013.01); *Y10T 29/417* (2015.01); *Y10T 29/49115* (2015.01)

(56) References Cited

U.S. PATENT DOCUMENTS

| | | | |
|---|---|---|---|
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,278,011 | B2 | 10/2012 | Zhu et al. |
| 8,426,067 | B2 | 4/2013 | Tsukada et al. |
| 8,641,921 | B2 | 2/2014 | Gibot et al. |
| 9,045,346 | B2 | 6/2015 | Nesper et al. |
| 9,216,907 | B2 | 12/2015 | Nakano et al. |
| 2008/0254296 | A1 | 10/2008 | Handa et al. |
| 2010/0143798 | A1 | 6/2010 | Zhamu et al. |
| 2010/0176337 | A1 | 7/2010 | Zhamu et al. |
| 2010/0233538 | A1 | 9/2010 | Nesper et al. |
| 2010/0233546 | A1 | 9/2010 | Nesper et al. |
| 2010/0248034 | A1 | 9/2010 | Oki et al. |
| 2010/0291438 | A1 | 11/2010 | Ahn et al. |
| 2010/0330421 | A1 | 12/2010 | Cui et al. |
| 2011/0012067 | A1 | 1/2011 | Kay |
| 2011/0111299 | A1 | 5/2011 | Liu et al. |
| 2011/0111303 | A1 | 5/2011 | Kung et al. |
| 2011/0121240 | A1 | 5/2011 | Amine et al. |
| 2011/0159372 | A1 | 6/2011 | Zhamu et al. |
| 2011/0223482 | A1 | 9/2011 | Fujii et al. |
| 2011/0229795 | A1 | 9/2011 | Niu et al. |
| 2012/0045688 | A1 | 2/2012 | Liu et al. |
| 2012/0058397 | A1 | 3/2012 | Zhamu et al. |
| 2012/0088156 | A1 | 4/2012 | Nomoto et al. |
| 2012/0100402 | A1 | 4/2012 | Nesper et al. |
| 2014/0113188 | A1 | 4/2014 | Gibot et al. |
| 2015/0270548 | A1 | 9/2015 | Nesper et al. |

FOREIGN PATENT DOCUMENTS

| | | |
|---|---|---|
| CN | 102044666 A | 5/2011 |
| EP | 2 228 854 A1 | 9/2010 |
| EP | 2 228 855 A1 | 9/2010 |
| EP | 2256087 A | 12/2010 |
| EP | 2352189 A | 8/2011 |
| EP | 2357693 A | 8/2011 |
| EP | 2413402 A | 2/2012 |
| EP | 2 445 049 A1 | 4/2012 |
| JP | 06-302315 | 10/1994 |
| JP | 2005-276476 A | 10/2005 |
| JP | 2006-261062 | 9/2006 |
| JP | 2006-265751 | 10/2006 |
| JP | 2007-018829 | 1/2007 |
| JP | 2008-257894 | 10/2008 |
| JP | 2009-159388 A | 7/2009 |
| JP | 2009-524567 | 7/2009 |
| JP | 2009-176721 | 8/2009 |
| JP | 2009-272041 | 11/2009 |
| JP | 2009-301813 A | 12/2009 |
| JP | 2010-049873 | 3/2010 |
| JP | 2010-103051 A | 5/2010 |
| JP | 2010-521797 | 6/2010 |
| JP | 2010-219048 | 9/2010 |
| JP | 2010-251302 A | 11/2010 |
| JP | 2010-275186 A | 12/2010 |
| JP | 2011-503804 | 1/2011 |
| JP | 2011-032156 A | 2/2011 |
| JP | 2011-071018 | 4/2011 |
| JP | 2011-517053 | 5/2011 |
| JP | 2011-159388 A | 8/2011 |
| JP | 2012-094516 | 5/2012 |
| JP | 2012-204150 | 10/2012 |
| KR | 2010-0103428 | 9/2010 |
| WO | WO-2006/062947 A2 | 6/2006 |
| WO | WO-2007/061945 A2 | 5/2007 |
| WO | WO-2008/113570 | 9/2008 |
| WO | WO-2009/061685 A1 | 5/2009 |
| WO | WO-2009/127901 A1 | 10/2009 |
| WO | WO-2009/144600 A2 | 12/2009 |

OTHER PUBLICATIONS

Sep. 16, 2015—Information Offer Form (Application No. JP2012-186537) Dated Sep. 16, 2016.
Oct. 13, 2015—Notification (Application No. JP2012-186537) Dated Oct. 13, 2015.
Jan. 6, 2016—Information Offer Form (Application No. JP2012-186537) Dated Jan. 6, 2016.
Jan. 13, 2016—Notification (Application No. JP2012-186537) Dated Dated Jan. 13, 2016.
Sirisopanaporn.C et al., "Dependence of Li2FeSiO4 Electrochemistry on Structure", J. Am. Chem. Soc. (Journal of the American Chemical Society), 2011, vol. 133, No. 5, pp. 1263-1265.
Taiwanese Office Action (Application No. 101131168) Dated Mar. 23, 2016.
Sep. 16, 2015—Information Offer Form (Application No. JP2012-1136537) Dated Sep. 16, 2015.
"International Search Report (Application No. PCT/JP2012/072090; PCT15722) Dated Nov. 13, 2012,".
"Written Opinion (Application No. PCT/JP2012/072090; PCT15722) Dated Nov. 13, 2012,".
Zhou.X et al., "Graphene modified LiFePO4 cathode materials for high power lithium ion batteries ,", J. Mater. Chem. (Journal of Materials Chemistry), 2011, vol. 21, pp. 3353-3358.
Su.F et al., "Flexible and planar graphene conductive additives for lithium-ion batteries,", J. Mater. Chem. (Journal of Materials Chemistry), 2010, vol. 20, pp. 9644-9650.
Yu.G et al., "Solution-Processed Graphene/MnO2 Nanostructured Textiles for High-Performance Electrochemical Capacitors,", Nano Letters, 2011, vol. 11, No. 7, pp. 2905-2911.
Kuwahara et al., "Hydrothermal Synthesis of LiFePO$_4$ with small Particle Size and its Electrochemical Properties", Journal of Electroceramics, 2010, vol. 24, pp. 69-75
Wang.L et al., "A facile method of preparing mixed conducting LiFePO4/graphene composites for lithium-ion batteries", Solid State Ionics, Oct. 28, 2010, vol. 181, pp. 1685-1689, Elsevier.

100nm

METHOD OF MANUFACTURING POSITIVE ELECTRODE ACTIVE MATERIAL FOR LITHIUM ION BATTERY

TECHNICAL FIELD

The present invention relates to a method of manufacturing a positive electrode active material for a power storage device and to a power storage device.

BACKGROUND ART

With an increase in concern for the environmental issues, power storage devices such as secondary batteries and electric double layer capacitors used for power supply for hybrid vehicles and the like have been actively developed. In particular, a lithium ion battery and a lithium ion capacitor having high energy performance have attracted attention. The lithium ion battery, which is compact but can store a large amount of electricity, has been already mounted on a portable information terminal such as a mobile phone or a notebook personal computer, and has helped miniaturization of products.

The secondary battery and the electric double layer capacitor have a structure in which an electrolyte is provided between a positive electrode and a negative electrode. It is known that each of the positive electrode and negative electrode includes a current collector and an active material provided in contact with the current collector. For example, in a lithium ion battery, a compound capable of occluding and releasing lithium ions is used in electrodes as an active material, and an electrolyte is provided between the electrodes.

Various approaches have been taken to improve the characteristics of lithium ion batteries. Study of positive electrode active materials for lithium ion batteries is one example.

Compounds containing lithium and oxygen, and the like are known as a positive electrode active material of a lithium ion battery (see Patent Document 1).

In particular, lithium iron phosphate ($LiFePO_4$) has attracted attention as a positive electrode active material. Lithium iron phosphate has advantages such as inexpensiveness. A lithium ion battery formed using as a positive electrode active material a compound which involves $Fe^{2+}$/$Fe^{3+}$ oxidation-reduction has the advantages of exhibiting high voltage (about 3.5 V), having favorable cycle characteristics, having higher energy density than a lithium ion battery formed using a compound such as lithium cobalt oxide ($LiCoO_2$) or lithium nickel oxide ($LiNiO_2$) as a positive electrode active material because of its theoretical capacity of about 170 mAhg$^{-1}$, and the like.

However, when used as a positive electrode active material of a lithium ion battery, lithium iron phosphate has the problem of difficulty in achieving high output due to its slow lithium diffusion and low electron conductivity. In order to obtain a high-output lithium ion battery by increasing the area of contact between lithium iron phosphate and an electrolyte solution, there has been a report of a method for increasing a specific surface area by making lithium iron phosphate crystals into microparticles.

For example, it is reported in Non-Patent Document 1 that particles of lithium iron phosphate crystals synthesized by a hydrothermal method in a nitrogen atmosphere have sizes of approximately 300 nm to 500 nm.

REFERENCES

[Patent Document 1] Japanese Published Patent Application No. 2008-257894

[Non-Patent Document 1] Kuwahara et al., "Hydrothermal synthesis of $LiFePO_4$ with small particle size and its electrochemical properties", Journal of Electroceramics, 2010, Vol. 24, pp. 69-75

DISCLOSURE OF INVENTION

It is an object of one embodiment of the present invention to manufacture a positive electrode active material including a compound containing lithium and oxygen and having a large specific surface area. It is another object to manufacture a high-output lithium ion battery with a large area of contact between a positive electrode active material and an electrolyte solution.

At least one of aqueous solutions A, B, and C includes graphene oxide. The aqueous solution A is dripped into the aqueous solution C, so that a mixed solution E including a precipitate D is prepared. The mixed solution E is dripped into the aqueous solution B, so that a mixed solution G including a precipitate F is prepared. The mixed solution G is subjected to heat treatment in a pressurized atmosphere, so that a mixed solution H is prepared, and the mixed solution H is then filtered. Thus, particles of a compound containing lithium and oxygen are obtained. Note that a compound containing lithium and oxygen is referred to as an oxide containing lithium in some cases.

Note that the aqueous solution A includes lithium, the aqueous solution B includes iron, manganese, cobalt, or nickel, and the aqueous solution C includes a phosphoric acid.

Note that the obtained particles of the compound containing lithium and oxygen are preferably subjected to cleaning treatment to remove impurities and then to drying treatment.

The thus manufactured particles of the compound containing lithium and oxygen have a small size owing to the action of graphene oxide. This is attributed to the facts that graphene oxide has a sheet-like shape and graphene oxide is negatively charged in water. Note that the particles of the compound containing lithium and oxygen are positively charged in water.

Since the positively charged particles of the compound containing lithium and oxygen and the negatively charged graphene oxide electrically attract each other, crystal growth of the particles of the compound containing lithium and oxygen occurs in the state where the particles are in contact with graphene oxide. Graphene oxide acts to inhibit crystal growth of the particles of the compound containing lithium and oxygen; thus, the size of the particles of the compound containing lithium and oxygen does not increase easily.

Note that a residue obtained by filtering the mixed solution H includes graphene oxide besides the target compound containing lithium and oxygen. This graphene oxide may be removed by cleaning treatment or separation treatment, or may remain.

With the use of graphene oxide and a compound containing lithium and oxygen, a positive electrode active material layer including graphene oxide among particles of the compound containing lithium and oxygen can be manufactured. Graphene oxide, which exhibits conductivity depending on the concentration of oxygen, functions as a conduction auxiliary agent. In addition, graphene oxide can function as a binder. In other words, manufacturing a positive electrode active material layer with graphene oxide and the compound containing lithium and oxygen which are included in the residue can shorten the manufacturing process. Thus, the productivity in manufacturing positive electrodes including the positive electrode active material layer can be increased. In addition, the productivity in manufacturing lithium ion batteries using the positive electrodes can be increased.

Note that reduction treatment may be performed on graphene oxide during the manufacturing process of the positive electrode active material layer. Graphene oxide with low oxygen concentration or graphene has high conductivity and is suitable for a conduction auxiliary agent.

A specific surface area can be increased when a positive electrode is manufactured, as described above, using particles of a compound containing lithium and oxygen and serving as a positive electrode active material which have a small diameter. Thus, by use of the positive electrode, a high-output lithium ion battery can be obtained.

In addition, the productivity in manufacturing lithium ion batteries can be increased by using graphene oxide included in the residue, as a conduction auxiliary agent and/or a binder of a positive electrode active material layer.

A positive electrode active material including a compound containing lithium and oxygen and having a large specific surface area can be manufactured. In addition, a high-output lithium ion battery with a large area of contact between a positive electrode active material and an electrolyte solution can be manufactured.

BEST MODE FOR CARRYING OUT THE INVENTION

Figure 1:
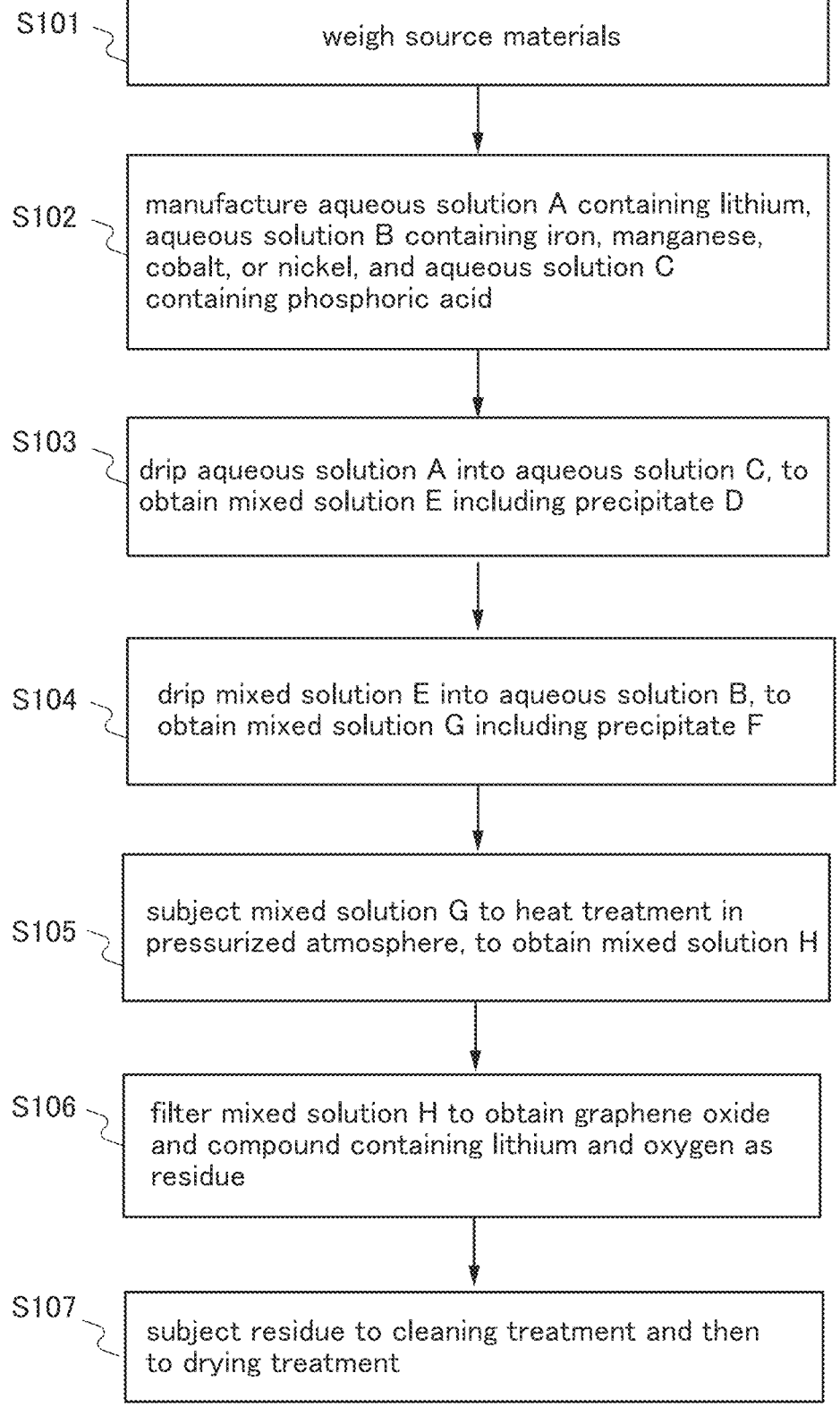
FIG. 1 is a flow chart showing a method of manufacturing a positive electrode active material.

Embodiments of the present invention will be described in detail below with reference to drawings. Note that the present invention is not limited to the description below, and it is easily understood by those skilled in the art that modes and details of the present invention can be modified in various ways. In addition, the present invention should not be construed as being limited to the description in the embodiments given below. Note that, in the description of modes of the present invention with reference to the drawings, the same components in different diagrams are commonly denoted by the same reference numeral. Note that the same hatch pattern is applied to similar parts, and the similar parts are not especially denoted by reference numerals in some cases.

Note that ordinal numbers such as "first" and "second" are used for convenience and do not denote the order of steps or the stacking order of layers. In addition, the ordinal numbers in this specification do not denote any particular names to define the invention.

(Embodiment 1)

In this embodiment, a method of manufacturing a positive electrode active material for a lithium ion battery by hydrothermal method which is one embodiment of the present invention will be described with reference to FIG. 1.

Examples of positive electrode active materials include $LiFePO_4$, lithium nickel phosphate ($LiNiPO_4$), lithium cobalt phosphate ($LiCoPO_4$), lithium manganese phosphate ($LiMnPO_4$), $Li_2FeSiO_4$, and $Li_2MnSiO_4$.

For example, the case of manufacturing $LiFePO_4$ which is a positive electrode active material is described. First, lithium hydroxide monohydrate ($LiOH.H_2O$), iron(II) chloride tetrahydrate ($FeCl_2.4H_2O$), and ammonium dihydrogen phosphate ($NH_4H_2PO_4$) which are source materials are weighed so that the molar ratio of $LiOH.H_2O$ to $FeCl_2.4H_2O$ and $NH_4H_2PO_4$ is 2:1:1 (Step S101).

Note that $LiOH.H_2O$ may be replaced with anhydrous lithium hydroxide (LiOH), lithium carbonate ($Li_2CO_3$), lithium oxide ($Li_2O$), lithium nitrate ($LiNO_3$), lithium dihydrogen phosphate ($LiH_2PO_4$), lithium acetate ($CH_3COOLi$), lithium phosphate ($Li_3PO_4$), or the like.

$FeCl_2.4H_2O$ may be replaced with iron(II) sulfate heptahydrate ($FeSO_4.7H_2O$), iron(II) phosphate octahydrate ($Fe_3(PO_4)_2.8H_2O$), iron(II) acetate ($Fe(CH_3COO)_2$), iron(II) oxalate ($FeC_2O_4$), iron(II) sulfate ($FeSO_4$), or the like.

$NH_4H_2PO_4$ may be replaced with diammonium hydrogen phosphate (($NH_4)_2HPO_4$), phosphoric acid ($H_3PO_4$), or the like.

Next, the source materials are each dissolved in water which has been degassed by nitrogen bubbling in a nitrogen atmosphere. Here, a solution of $LiOH.H_2O$ in water is referred to as an aqueous solution A, a solution of $FeCl_2.4H_2O$ in water is referred to as an aqueous solution B, and a solution of $NH_4H_2PO_4$ in water is referred to as an aqueous solution C. Note that graphene oxide is dispersed in at least one of the aqueous solutions A, B, and C (Step S102). It is preferable that graphene oxide be dispersed in the aqueous solution B and the aqueous solution C. Graphene oxide may be dispersed in the aqueous solution by ultrasonic treatment, for example.

Note that in this specification, graphene refers to a one-atom-thick sheet of carbon molecules having holes through which ions can pass and having $sp^2$ bonds, or a stack of 2 to 100 one-atom-thick sheets thereof. Note that the stack is also referred to as multilayer graphene.

Note that in graphene oxide, part of an end of a graphene sheet is terminated by carboxyl groups (—COOH). Therefore, in an aqueous solution, hydrogen ions are released from the carboxyl groups and graphene oxide itself is negatively charged. Note that graphene oxide may be replaced with graphite oxide.

Next, the aqueous solution A is dripped into the aqueous solution C, so that a mixed solution E including a precipitate D is prepared (Step S103). Here, the precipitate D is $Li_3PO_4$.

Then, the mixed solution E is dripped into the aqueous solution B, so that a mixed solution G including a precipitate F is prepared (Step S104). Here, the precipitate F is a precursor of $LiFePO_4$.

Next, the mixed solution G is subjected to heat treatment in a pressurized atmosphere of 0.1 MPa to 4.0 MPa at a temperature of 100° C. to 250° C. for 1 hour to 24 hours, so that a mixed solution H including a compound containing lithium and oxygen that is a reaction product is prepared (Step S105). Here, the compound containing lithium and oxygen is $LiFePO_4$.

Next, the mixed solution H is filtered to give graphene oxide and the compound containing lithium and oxygen as a residue (Step S106).

Then, the residue is subjected to cleaning treatment and then to drying treatment (Step S107). Note that as the cleaning treatment, cleaning with running pure water may be performed about 10 times, for example. As the drying treatment, the residue having been subjected to the cleaning treatment may be processed in a reduced pressure atmosphere of $3.3 \times 10^3$ Pa at a temperature of 50° C. for 24 hours, for example.

Note that graphene oxide does not react with the compound containing lithium and oxygen. However, graphene oxide attracts the compound containing lithium and oxygen which is positively charged in water because graphene oxide has a sheet-like shape and is negatively charged in water. Crystal growth of the compound containing lithium and oxygen occurs in the state where the compound is in contact with graphene oxide, which inhibits crystal growth of the compound containing lithium and oxygen. Thus, the size of the resulting particles of the compound containing lithium and oxygen can be small. Specifically, particles of the compound containing lithium and oxygen which have a size of 30 nm to 400 nm, preferably 30 nm to 250 nm, can be obtained.

The obtained particles of the compound containing lithium and oxygen may be separated according to the size by using a filter such as a membrane filter.

In this manner, with the use of the aqueous solution including graphene oxide, the particles of the compound containing lithium and oxygen which have a small size can be manufactured.

Note that after the particles of the compound containing lithium and oxygen are obtained, graphene oxide may, but does not necessarily have to, be removed.

With the use of the thus obtained particles of the compound containing lithium and oxygen which have a small size, a positive electrode active material having a large specific surface area can be manufactured.

In addition, when the particles of the compound containing lithium and oxygen which have a small size as described in this embodiment are used as a positive electrode active material, a high-output lithium ion battery with a large area of contact between the positive electrode active material and an electrolyte solution can be manufactured.

Although the case of manufacturing $LiFePO_4$ as the compound containing lithium and oxygen is described in this embodiment, the present invention is not limited thereto. For example, the present invention can be applied to manufacturing of $LiNiPO_4$, $LiCoPO_4$, $LiMnPO_4$, $Li_2FeSiO_4$, or $Li_2MnSiO_4$ as the compound containing lithium and oxygen.

Specifically, in the case where $LiNiPO_4$ is manufactured, $Li_2CO_3$, NiO, and $NH_4H_2PO_4$ may be used as source materials. In the case where $LiCoPO_4$ is manufactured, $Li_2CO_3$, CoO, and $(NH_4)_2HPO_4$ may be used as source materials. In the case where $LiMnPO_4$ is manufactured, $Li_2CO_3$, $MnCO_3$, and $NH_4H_2PO_4$ may be used as source materials. In the case where $Li_2FeSiO_4$ is manufactured, $Li_2SiO_3$ and $FeC_2O_4 \cdot 2H_2O$ may be used as source materials. In the case where $Li_2MnSiO_4$ is manufactured, $Li_2SiO_3$ and $MnC_2O_4$ may be used as source materials. Note that the source materials of the positive electrode active material given here are mere examples, and the present invention is not limited to these materials.

This embodiment can be implemented in appropriate combination with any of the other embodiments.

(Embodiment 2)

Figure 2:
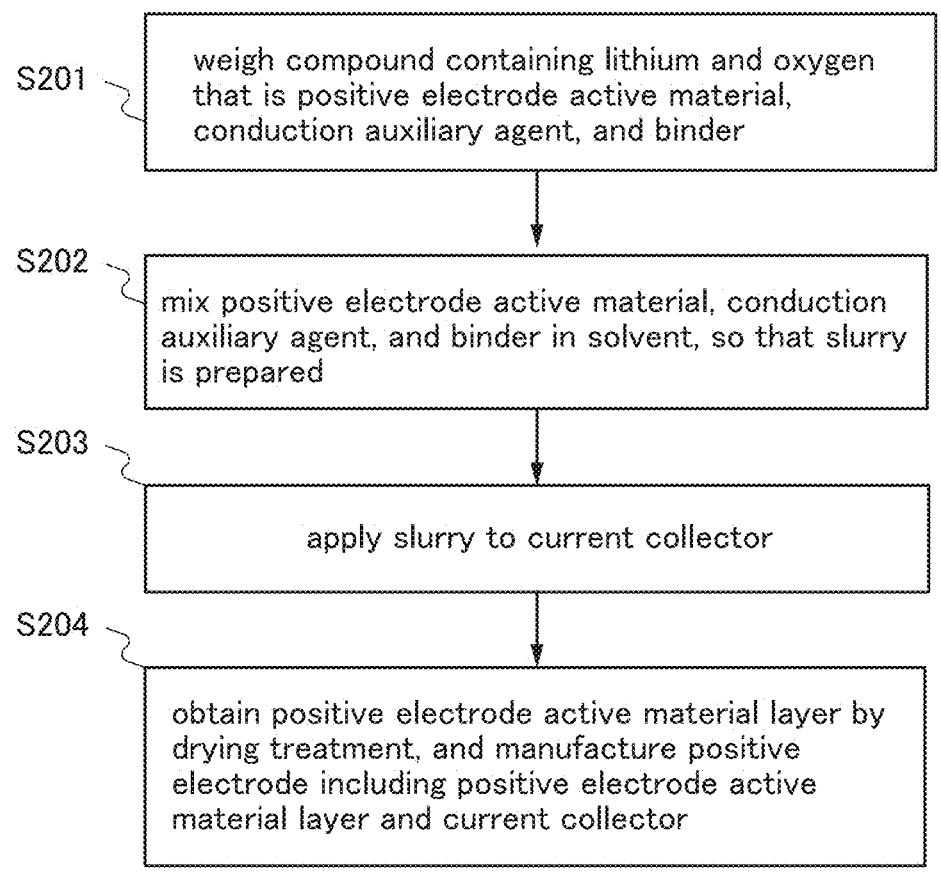
FIG. 2 is a flow chart showing a method of manufacturing a positive electrode.

In this embodiment, a method of manufacturing a positive electrode of a lithium ion battery by using the compound containing lithium and oxygen which is manufactured in Embodiment 1 will be described with reference to FIG. 2.

First, the compound containing lithium and oxygen that is a positive electrode active material, a conduction auxiliary agent, and a binder are weighed (Step S201). For example, the proportions of the positive electrode active material, the conduction auxiliary agent, and the binder may range from 80 wt % to 96 wt %, from 2 wt % to 10 wt %, and from 2 wt % to 10 wt %, respectively.

Here, as the conduction auxiliary agent, a carbon-based conduction auxiliary agent such as graphene, graphene oxide, graphite, carbon fiber, carbon black, acetylene black, or VGCF (registered trademark), a metal such as copper, nickel, aluminum, or silver, or powder, fiber, or the like of a mixture thereof may be used. As the binder, a polysaccharide, a thermoplastic resin, a polymer with rubber elasticity, or the like may be used. Examples thereof include graphene, graphene oxide, starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene monomer (EPDM), sulfonated EPDM, styrene-butadiene rubber, butadiene rubber, fluororubber, and polyethylene oxide.

Next, the weighed positive electrode active material, conduction auxiliary agent, and binder are mixed in a solvent, so that a slurry is prepared (Step S202). Here, as the solvent, N-methyl-2-pyrrolidone, lactic acid ester, or the like may be used.

Then, the slurry is applied to a current collector (Step S203). Here, as the current collector, a highly conductive metal such as aluminum or stainless steel may be used.

Next, the solvent is volatilized from the slurry by drying treatment, so that a positive electrode active material layer is obtained. A positive electrode including the positive electrode active material layer and the current collector is also manufactured (Step S204). Here, the drying treatment may be performed in a reduced pressure atmosphere at a temperature of 130° C. for 1 hour, for example.

Note that graphene and graphene oxide function as both the conduction auxiliary agent and the binder. Therefore, in the case where graphene or graphene oxide is used as the conduction auxiliary agent and the binder, the proportion of the positive electrode active material in the positive electrode active material layer can be increased. As a result, the charge/discharge capacity per volume of a lithium ion battery can be increased.

In the above manner, the positive electrode of the lithium ion battery can be manufactured.

With the use of the thus manufactured positive electrode, the area of contact between the positive electrode active material and an electrolyte solution can be increased because particles of the positive electrode active material included in the positive electrode have a small size. Thus, a high-output lithium ion battery can be manufactured.

(Embodiment 3)

Figure 3:
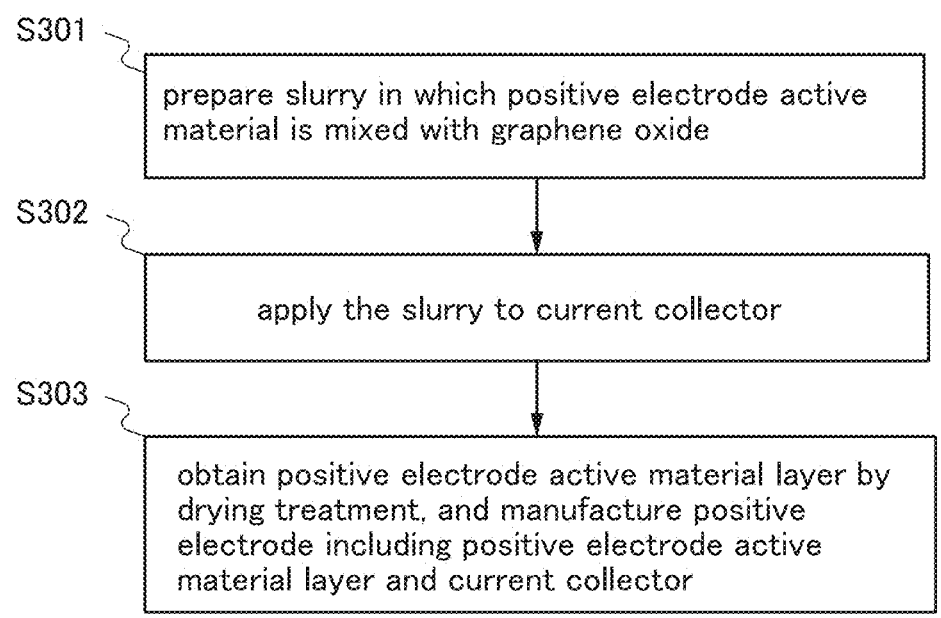
FIG. 3 is a flow chart showing a method of manufacturing a positive electrode.

In this embodiment, a method of manufacturing a positive electrode by using the residue including the compound containing lithium and oxygen and graphene oxide which is manufactured in Embodiment 1 will be described with reference to FIG. 3.

As described in Embodiment 2, graphene and graphene oxide function as both the conduction auxiliary agent and the binder of the positive electrode active material layer. Therefore, by utilization of the residue including the compound containing lithium and oxygen, which is a positive electrode active material, and graphene oxide in Embodiment 1, a positive electrode active material layer can be manufactured without separately preparing a conduction auxiliary agent and/or a binder.

Specifically, first, a slurry in which the compound containing lithium and oxygen, which is a positive electrode active material, is mixed with graphene oxide is prepared (Step S301). Note that in the case where sufficient conductivity or the like cannot be obtained with graphene oxide included in the residue alone, a smaller amount of conduction auxiliary agent and/or binder than in Embodiment 2 may be mixed.

Next, the slurry is applied to a current collector (Step S302).

Next, the solvent is volatilized from the slurry by drying treatment, so that a positive electrode active material layer is obtained. A positive electrode including the positive electrode active material layer and the current collector is also manufactured (Step S303).

In the above manner, the positive electrode of the lithium ion battery can be manufactured without separately preparing a conduction auxiliary agent and/or a binder. Therefore, the number of steps from manufacturing a positive electrode active material to manufacturing a positive electrode can be reduced; thus, the productivity in manufacturing positive electrodes can be improved. In addition, the productivity in manufacturing lithium ion batteries including the positive electrodes can be increased.

Although the example in which graphene oxide is used as a conduction auxiliary agent and/or a binder is described in this embodiment, the present invention is not limited thereto. For example, graphene oxide having low oxygen concentration or graphene which is obtained by reducing graphene oxide may be used as a conduction auxiliary agent and/or a binder. Graphene oxide may be reduced before Step S301 or after Step S303. Graphene oxide having low oxygen concentration or graphene has high conductivity, and even a small amount of graphene oxide having low oxygen concentration or graphene can sufficiently function as a conduction auxiliary agent.

With the use of the thus manufactured positive electrode, the area of contact between the positive electrode active material and an electrolyte solution can be increased because particles of the positive electrode active material included in the positive electrode have a small size. Thus, a high-output lithium ion battery can be manufactured.

(Embodiment 4)

In this embodiment, an example of manufacturing a lithium ion battery, which is a power storage device, by using the positive electrode described in Embodiment 2 or Embodiment 3 will be described. The schematic structure of the lithium ion battery is illustrated in FIG. 4.

Figure 4:
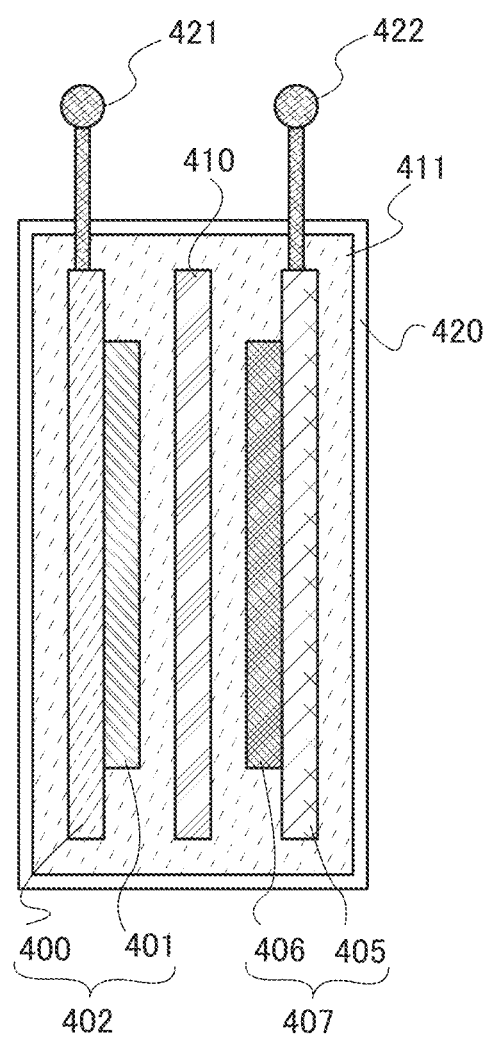
FIG. 4 illustrates a lithium ion battery.

In the lithium ion battery illustrated in FIG. 4, a positive electrode 402, a negative electrode 407, and a separator 410 are provided in a housing 420 which isolates the components from the outside, and the housing 420 is filled with an electrolyte solution 411. The separator 410 is provided between the positive electrode 402 and the negative electrode 407.

A positive electrode active material layer 401 is formed in contact with a positive electrode current collector 400. Here, the positive electrode active material layer 401 and the positive electrode current collector 400 provided with the positive electrode active material layer 401 are collectively referred to as the positive electrode 402.

On the other hand, a negative electrode active material layer 406 is formed in contact with a negative electrode current collector 405. Here, the negative electrode active material layer 406 and the negative electrode current collector 405 provided with the negative electrode active material layer 406 are collectively referred to as the negative electrode 407.

A first electrode 421 and a second electrode 422 are connected to the positive electrode current collector 400 and the negative electrode current collector 405, respectively, and charge and discharge are performed through the first electrode 421 and the second electrode 422.

Moreover, there are certain gaps between the positive electrode active material layer 401 and the separator 410 and between the negative electrode active material layer 406 and the separator 410. However, the structure is not limited to this; the positive electrode active material layer 401 may be in contact with the separator 410, and the negative electrode active material layer 406 may be in contact with the separator 410. Further, the lithium ion battery may be rolled into a cylinder with the separator 410 provided between the positive electrode 402 and the negative electrode 407.

The positive electrode current collector 400 may have a structure similar to that of the current collector described in Embodiment 2 or Embodiment 3.

For the positive electrode 402, Embodiments 1 to 3 may be referred to. Specifically, the positive electrode 402 is manufactured by forming the positive electrode active material layer 401 on the positive electrode current collector 400 as follows: the slurry including the positive electrode active material described in Embodiment 2 or 3 is dripped and spread thinly by a casting method, and then pressed with a roller press machine so that the thickness becomes uniform; after that, reduced pressure drying (under a pressure of 10 Pa or lower) or heat drying (at a temperature of 70° C. to 280° C., preferably 90° C. to 170° C.) is performed. The positive electrode active material layer 401 may be formed to a thickness with which a crack or detachment (separation) is not caused, specifically greater than or equal to 20 μm and less than or equal to 100 μm.

As the negative electrode current collector 405, a metal having high conductivity such as copper, stainless steel, iron, or nickel, or the like can be used.

As the negative electrode active material layer 406, lithium, aluminum, graphite, silicon, germanium, or the like is used. The negative electrode active material layer 406 may be formed on the negative electrode current collector 405 by a coating method, a sputtering method, an evaporation method, or the like. Any of the materials may be used alone as the negative electrode active material layer 406. The theoretical lithium ion occlusion capacity of germanium, silicon, lithium, or aluminum is larger than that of graphite. When the lithium ion occlusion capacity is large, sufficient charge/discharge capacity can be obtained even in a small area. However, silicon increases its volume approximately four times its original volume by occluding lithium ions and returns to the original volume by releasing the lithium ions. Thus, charging and discharging of a lithium ion battery may cause silicon itself to become vulnerable or may cause explosion. Therefore, a configuration with volume changes taken into consideration is preferable.

Figure 7A:
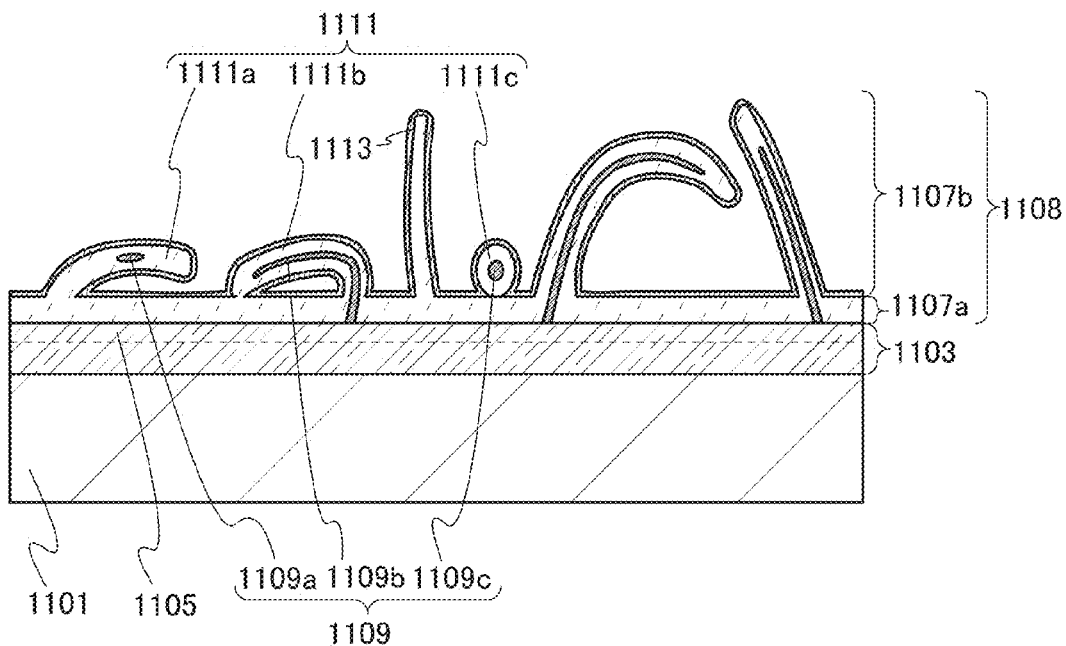
FIGS. 7A and 7B each illustrate a structure of a negative electrode.
Figure 7B:
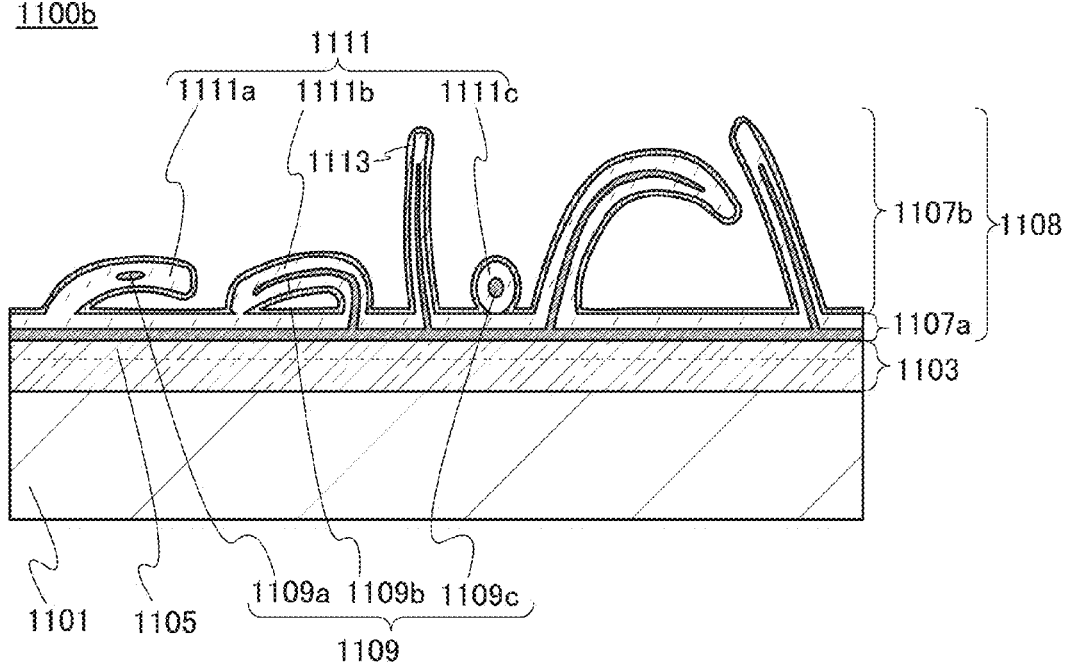

Note that a negative electrode 1100a or a negative electrode 1100b illustrated in FIG. 7A or 7B may be used as the negative electrode 407.

A negative electrode active material 1108 includes a negative electrode active material with a plurality of whiskers which includes a region 1107a and a region 1107b, and a conductive layer 1113 covering the negative electrode active material with the plurality of whiskers. Note that in this specification, the negative electrode active material with a plurality of whiskers refers to a negative electrode active material including a flat region such as the region 1107a and a region projecting from the region 1107a like a whisker (or like a string or a fiber) such as the region 1107b. Further, in order to clearly show that the negative electrode active material 1108 includes a plurality of whiskers each of which is a projecting region of the negative electrode active material, as illustrated in FIGS. 7A and 7B, the negative electrode active material which includes the region 1107a and the region 1107b is referred to as the negative electrode active material with a plurality of whiskers. For the conductive layer 1113, graphene or graphene oxide may be used, for example.

The region 1107a is provided in contact with the conductive layer 1103, and the region 1107b projects from the region 1107a and is provided randomly. Therefore, the negative electrode active material 1108 has a fine surface structure reflecting the shape of the negative electrode active material with a plurality of whiskers.

Further, a mixed layer 1105 may be provided in part of or the whole of a surface layer of the conductive layer 1103 by reaction with the negative electrode active material 1108 (in particular, the negative electrode active material with a plurality of whiskers). Note that the mixed layer 1105 also functions as a conductive layer because the mixed layer 1105 has conductivity. In the case where the mixed layer 1105 is formed on the part of the surface layer of the conductive layer 1103, the mixed layer 1105 and the part of the conductive layer 1103 are provided below the negative electrode active material with a plurality of whiskers (in particular, the region 1107a) (not illustrated). In the case where the mixed layer 1105 is formed on the whole of the surface layer of the conductive layer 1103, the mixed layer 1105 is provided below the negative electrode active material with a plurality of whiskers (in particular, the region 1107a) (see FIGS. 7A and 7B).

Note that the interface between the region 1107a and the region 1107b is not clear. Thus, the following surface is defined as the interface between the region 1107a and the region 1107b: the lowest surface of the negative electrode active material with a plurality of whiskers which is parallel to a surface of a substrate 1101 or the conductive layer 1103.

In the negative electrode active material 1108, the negative electrode active material with a plurality of whiskers preferably includes a core 1109 which has a crystalline structure and an outer shell 1111 which has an amorphous structure. The outer shell 1111 having the amorphous structure is resistant to changes in volume due to occlusion and release of lithium ions. The core 1109 having the crystalline structure has a high conductivity and has a feature of high-speed occlusion and release of lithium ions per mass. Therefore, by using the negative electrode 1100a or the negative electrode 1100b including the negative electrode active material with a plurality of whiskers including the core 1109 and the outer shell 1111, high-speed charging and discharging can be achieved, and a lithium ion battery with excellent charge/discharge capacity and cycle characteristics can be manufactured.

Note that the core 1109 is not limited to the core which is in contact with the conductive layer 1103 such as a core 1109b, and may be the core which extends from front to back of the drawing such as a core 1109c and the core which is localized such as a core 1109a. That is, the core 1109a, the core 1109b, and the core 1109c are collectively referred to as the core 1109. Further, an outer shell 1111a, an outer shell 1111b, and an outer shell 1111c are collectively referred to as the outer shell 1111.

The plurality of whiskers of the negative electrode active material in the region 1107b may have a columnar shape, a conical or pyramidal shape, or a needle-like shape. The plurality of whiskers of the negative electrode active material may be curved. The plurality of whiskers of the negative electrode active material may have a round end.

The plurality of whiskers of the negative electrode active material in the region 1107b may have different longitudinal directions. When the plurality of whiskers of the negative electrode active material have different longitudinal directions, in FIGS. 7A and 7B, a transverse cross-sectional shape of a whisker of the negative electrode active material (the cross-sectional shape of a portion including the core 1109c and the outer shell 1111c) is shown as well as a longitudinal cross-sectional shape of a whisker of the negative electrode active material (the cross-sectional shape of a portion including the core 1109b and the outer shell 1111b). In a transverse cross section of the plurality of whiskers of the negative electrode active material, the core 1109 is observed (or not observed) in the plurality of whiskers of the negative electrode active material in some cases depending on a position. Further, the transverse cross section of a whisker of the negative electrode active material is circular when the whisker of the negative electrode active material has a cylindrical or conical shape, and is polygonal when the whisker of the negative electrode active material has a prismatic or pyramidal shape. It is preferable that the longitudinal directions of the plurality of whiskers of the negative electrode active material be not uniform because in that case, one of the whiskers of the negative electrode active material is likely to be entangled with the other, so that detachment (or separation) of the plurality of whiskers of the negative electrode active material does not easily occur.

Note that the direction in which each of the plurality of whiskers of the negative electrode active material is extended from the region 1107a is called the longitudinal direction, and the cross-sectional shape thereof cut along the longitudinal direction is called a longitudinal cross-sectional shape. In addition, a cross-sectional shape of each of the plurality of whiskers of the negative electrode active material cut along a surface perpendicular to or substantially perpendicular to the longitudinal direction is called a transverse cross-sectional shape.

The maximum diameter of the core 1109 in the transverse cross section may be greater than or equal to 0.2 μm and less than or equal to 3 μm, preferably greater than or equal to 0.5 μm and less than or equal to 2 μm.

The length of the core 1109 is not particularly limited but may be greater than or equal to 0.5 μm and less than or equal to 1000 μm, preferably greater than or equal to 2.5 μm and less than or equal to 100 μm.

In the region 1107b, the maximum diameter of the plurality of whiskers of the negative electrode active material in the transverse cross section is greater than or equal to 0.2 μm and less than or equal to 10 μm, preferably greater than or equal to 1 μm and less than or equal to 5 μm. The length of the plurality of whiskers of the negative electrode active material is greater than or equal to 3 μm and less than or equal to 1000 μm, preferably greater than or equal to 6 μm and less than or equal to 200 μm.

Note that the "length" of the core 1109 or the outer shell 1111 refers to the distance between the top of the core 1109 or the outer shell 1111 and the region 1107a, in the direction along an axis passing through the center of the top (or the top surface) of the whisker of the negative electrode active material.

Further, the structure of the negative electrode active material with a plurality of whiskers is not limited to the above structure; the whole of the region 1107a and the region 1107b may have a crystalline structure, or the whole of the region 1107a and the region 1107b may have an amorphous structure.

In the negative electrode 1100a illustrated in FIG. 7A, part of the region 1107a (a region other than the region where the conductive layer 1103 is in contact with the core 1109) has an amorphous structure like the outer shell 1111. Further, the region 1107a may include a crystalline structure. Furthermore, the region 1107a may include one or more of the elements constituting either the conductive layer 1103 or the mixed layer 1105 or both.

In the negative electrode 1100b illustrated in FIG. 7B, a region of the region 1107a on the side in contact with the conductive layer 1103 has a crystalline structure like the core 1109. Further, the region 1107a may include an amorphous structure. Furthermore, the region 1107a may include one or more of the elements constituting either the conductive layer 1103 or the mixed layer 1105 or both.

For example, the negative electrode 1100a has a higher adhesion between the conductive layer 1103 and the region 1107a than the negative electrode 1100b. This is because an amorphous structure is more adaptable to the surface of the conductive layer 1103, on which the region 1107a is formed. In other words, an amorphous structure is more likely to be formed so as to be compatible with the surface of the conductive layer 1103. In addition, an amorphous structure is resistant to volume changes due to occlusion and release of lithium ions; thus, the negative electrode 1100a (especially the negative electrode active material with a plurality of whiskers) can be prevented from being detached due to repetitive charging and discharging, and a lithium ion battery with good cycle characteristics can be manufactured.

In the negative electrode 1100b, a highly conductive crystalline structure is in contact with a wider area of the conductive layer 1103 than in the negative electrode 1100a. Therefore, the negative electrode 1100b as a whole has high conductivity. Accordingly, a lithium ion battery capable of being charged and discharged at high speed and having high charge/discharge capacity can be manufactured.

The negative electrode active material with a plurality of whiskers can be formed by a low pressure chemical vapor deposition (LPCVD) method. Here, the negative electrode active material with a plurality of whiskers is formed at a temperature higher than 400° C. and lower than or equal to a temperature which an LPCVD apparatus, the substrate 1101, and the conductive layer 1103 can withstand, and preferably higher than or equal to 500° C. and lower than 580° C.

In the case where the negative electrode active material with a plurality of whiskers is formed, as a source gas, a deposition gas containing silicon is used. Specifically, $SiH_4$, $SiF_4$, $SiCl_4$, $Si_2Cl_6$, or the like may be used as the deposition gas containing silicon. Note that one or more kinds of a hydrogen gas and rare gases such as helium, neon, argon, and xenon may be contained in the source gas.

As the electrolyte, an electrolyte solution that is an electrolyte in a liquid state, or a solid electrolyte that is an electrolyte in a solid state may be used. The electrolyte solution contains lithium ions and is responsible for electrical conduction.

The electrolyte solution 411 includes, for example, a solvent and a lithium salt dissolved in the solvent. Examples of the lithium salt include LiCl, LiF, $LiClO_4$, $LiBF_4$, $LiAsF_6$, $LiPF_6$, and $Li(C_2F\,SO_2)_2N$.

Examples of the solvent of the electrolyte solution 411 include cyclic carbonates (such as ethylene carbonate (EC), propylene carbonate (PC), butylene carbonate (BC), and vinylene carbonate (VC)), acyclic carbonates (such as dimethyl carbonate (DMC), diethyl carbonate (DEC), ethylmethyl carbonate (EMC), methylpropyl carbonate (MPC), isobutyl methyl carbonate, and dipropyl carbonate (DPC)), aliphatic carboxylic acid esters (such as methyl formate, methyl acetate, methyl propionate, and ethyl propionate), acyclic ethers (such as γ-lactones such as γ-butyrolactone, 1,2-dimethoxyethane (DME), 1,2-diethoxyethane (DEE), and ethoxymethoxy ethane (EME)), cyclic ethers (such as tetrahydrofuran and 2-methyltetrahydrofuran), cyclic sulfones (such as sulfolane), alkyl phosphate esters (such as dimethylsulfoxide, 1,3-dioxolane, trimethyl phosphate, triethyl phosphate, and trioctyl phosphate), and fluorides thereof. These materials can be used either alone or in combination as the solvent of the electrolyte solution 411.

As the separator 410, paper, nonwoven fabric, a glass fiber, a synthetic fiber such as nylon (polyamide), vinylon (a polyvinyl alcohol based fiber), polyester, acrylic, polyolefin, or polyurethane, or the like may be used. Note that the separator 410 is not soluble in the electrolyte solution 411 described above.

More specific examples of materials of the separator 410 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, and nonwoven fabric, which may be used either alone or in combination.

When the lithium ion battery described above is charged, a positive electrode terminal is connected to the first electrode 421 and a negative electrode terminal is connected to the second electrode 422. An electron is taken away from the positive electrode 402 through the first electrode 421 and transferred to the negative electrode 407 through the second electrode 422. In addition, a lithium ion is eluted from the positive electrode active material in the positive electrode active material layer 401 of the positive electrode 402, reaches the negative electrode 407 through the separator 410, and is taken into the negative electrode active material in the negative electrode active material layer 406. The lithium ion and the electron are combined in this region and are occluded in the negative electrode active material layer 406. At the same time, in the positive electrode active material layer 401, an electron is released outside from the positive electrode active material, and an oxidation reaction of a transition metal (such as iron, manganese, cobalt, or nickel) contained in the positive electrode active material occurs.

At the time of discharge of the lithium ion battery, in the negative electrode 407, the negative electrode active material layer 406 releases an lithium ion, and an electron is transferred to the second electrode 422. The lithium ion passes through the separator 410, reaches the positive electrode active material layer 401, and is taken into the positive electrode active material in the positive electrode active material layer 401. At that time, an electron from the negative electrode 407 also reaches the positive electrode 402, and a reduction reaction of the transition metal contained in the positive electrode active material occurs.

With the use of the positive electrode described in Embodiment 2 or Embodiment 3, a high-output lithium ion battery can be manufactured.

In the case where graphene or graphene oxide is used as a conduction auxiliary agent of a positive electrode active material layer, the amount of the conduction auxiliary agent needed to improve conductivity can be small. Thus, the volume of the positive electrode active material layer can be small, and a positive electrode capable of easily occluding and releasing lithium ions can be manufactured.

This embodiment can be implemented in appropriate combination with any of the other embodiments.

(Embodiment 5)

In this embodiment, applications of the lithium ion battery described in Embodiment 4 will be described.

The lithium ion battery described in Embodiment 4 can be used in electronic devices, e.g., cameras such as digital cameras or video cameras, digital photo frames, portable information terminals (also referred to as cellular phones, cellular phone devices, tablet PCs, or the like), portable game machines, audio reproducing devices, and the like. Further, the lithium ion battery can be used in electric propulsion vehicles such as electric vehicles, hybrid electric vehicles, train vehicles, maintenance vehicles, carts, wheelchairs, or bicycles.

Figure 5A:
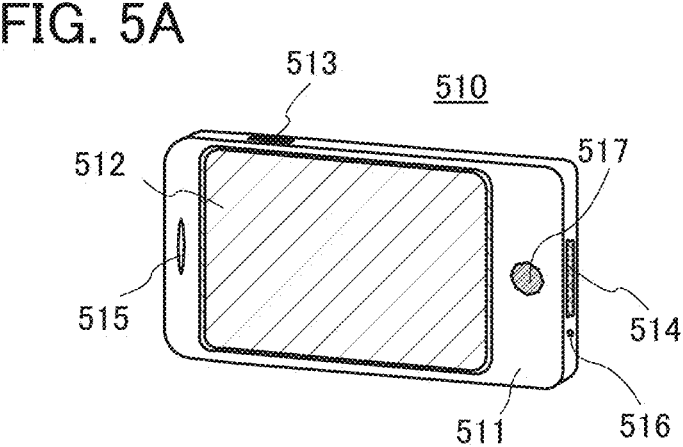
FIGS. 5A and 5B illustrate examples of applications to electronic devices.

FIG. 5A illustrates an example of a portable information terminal. In a portable information terminal 510, a display portion 512 is incorporated in a housing 511. The housing 511 is provided with an operation button 513, an operation button 517, an external connection port 514, a speaker 515, a microphone 516, and the like.

Figure 5B:
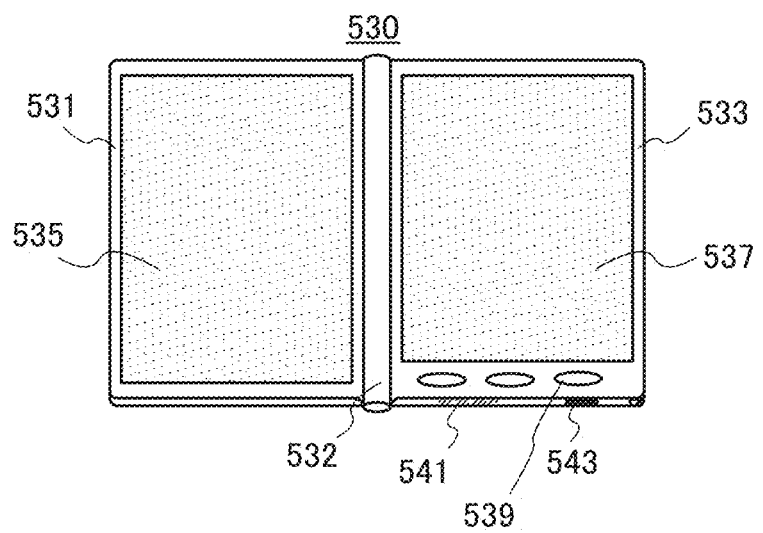

FIG. 5B illustrates another portable information terminal which is different from the portable information terminal 510. A portable information terminal 530 includes two housings, a first housing 531 and a second housing 533, which are combined with each other with a hinge 532. The first housing 531 and the second housing 533 can be opened and closed with the hinge 532 used as an axis. A first display portion 535 and a second display portion 537 are incorporated in the first housing 531 and the second housing 533, respectively. Note that the first display portion 535 and/or the second display portion 537 may be touch panels. In addition, the second housing 533 is provided with an operation button 539, a power switch 543, a speaker 541, and the like.

Figure 6:
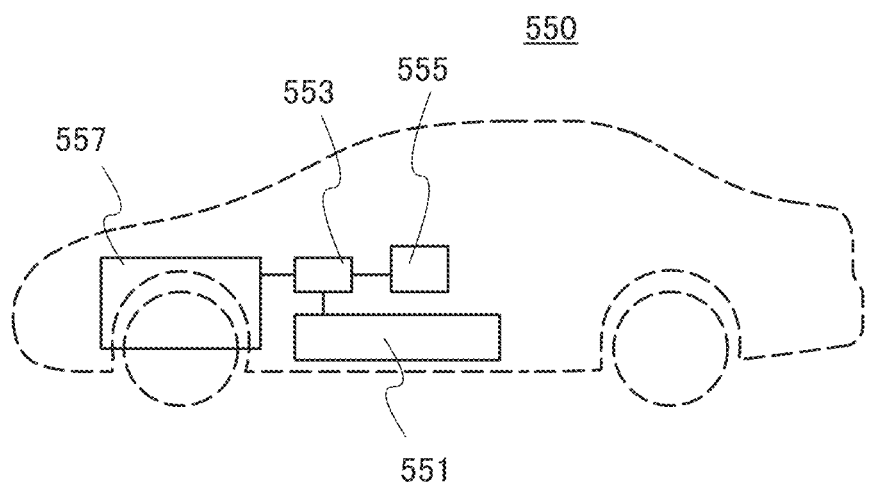
FIG. 6 illustrates an example of application to an electric vehicle.

FIG. 6 illustrates an example of an electric vehicle. An electric vehicle 550 is equipped with a lithium ion battery 551. The output of power of the lithium ion battery 551 is controlled by a control circuit 553 and the power is supplied to a driving device 557. The control circuit 553 is controlled by a computer 555.

The driving device 557 includes an electric motor (a DC motor or an AC motor), and, if necessary, an internal-combustion engine. In the case where the internal-combustion engine is incorporated, the internal-combustion engine and the electric motor are combined. The computer 555 outputs a control signal to the control circuit 553 on the basis of data of order (such as acceleration or stop) by a driver of the electric vehicle 550 or data of driving environment (such as an upgrade or a downgrade). The control circuit 553 adjusts the electric energy supplied from the lithium ion battery 551 in accordance with the control signal of the computer 555 to control the output of the driving device 557. In the case where the AC motor is mounted, an inverter which converts direct current into alternate current is incorporated.

The lithium ion battery 551 can be charged by power supply from the outside.

Note that in the case where the electric propulsion vehicle is a train vehicle, the train vehicle can be charged by power supply from an overhead cable or a conductor rail.

EXAMPLE 1

In this example, an example of manufacturing $LiFePO_4$ which is a positive electrode active material and has a small particle size will be described.

First, $LiOH.H_2O$, $FeCl_2.4H_2O$, and $NH_4H_2PO_4$ which were source materials were weighed so that the molar ratio of $LiOH.H_2O$ to $FeCl_2.4H_2O$ and $NH_4H_2PO_4$ was 2:1:1. Here, the source materials were weighed so that Fe was 0.2 M with respect to 100 ml of water.

Next, the source materials were each dissolved in water which had been degassed by nitrogen bubbling in a nitrogen atmosphere. Here, a solution of $LiOH.H_2H$ in 30 ml of water is referred to as an aqueous solution A, a solution of $FeCl_2.4H_2O$ in 30 ml of water is referred to as an aqueous solution B, and a solution of $NH_4H_2PO_4$ in 30 ml of water is referred to as an aqueous solution C. Note that 30 mg of graphene oxide powder was added to the aqueous solution B. In addition, 60 mg of graphene oxide powder was added to the aqueous solution C. After that, graphene oxide was dispersed in the aqueous solution B and the aqueous solution C by ultrasonic treatment.

Next, the aqueous solution A was dripped into the aqueous solution C, so that a mixed solution including $Li_3PO_4$ as a precipitate was obtained.

Next, the obtained mixed solution was dripped into the aqueous solution B, so that a mixed solution including a precursor of $LiFePO_4$ as a precipitate was obtained. Next, the obtained mixed solution was degassed by nitrogen bubbling, and 10 ml of pure water degassed similarly by nitrogen bubbling was added to the mixed solution to give 100 ml of a mixed solution.

Next, the obtained mixed solution was subjected to heat treatment in a pressurized atmosphere of 0.4 MPa at a temperature of 150° C. for 15 hours, so that a mixed solution including $LiFePO_4$ which was a reaction product was obtained.

Next, the obtained mixed solution was filtered to give $LiFePO_4$.

Next, $LiFePO_4$ was subjected to cleaning with running pure water 10 times, and dried in a reduced pressure atmosphere of $3.3 \times 10^3$ Pa at a temperature of 50° C. for 24 hours.

Figure 8:
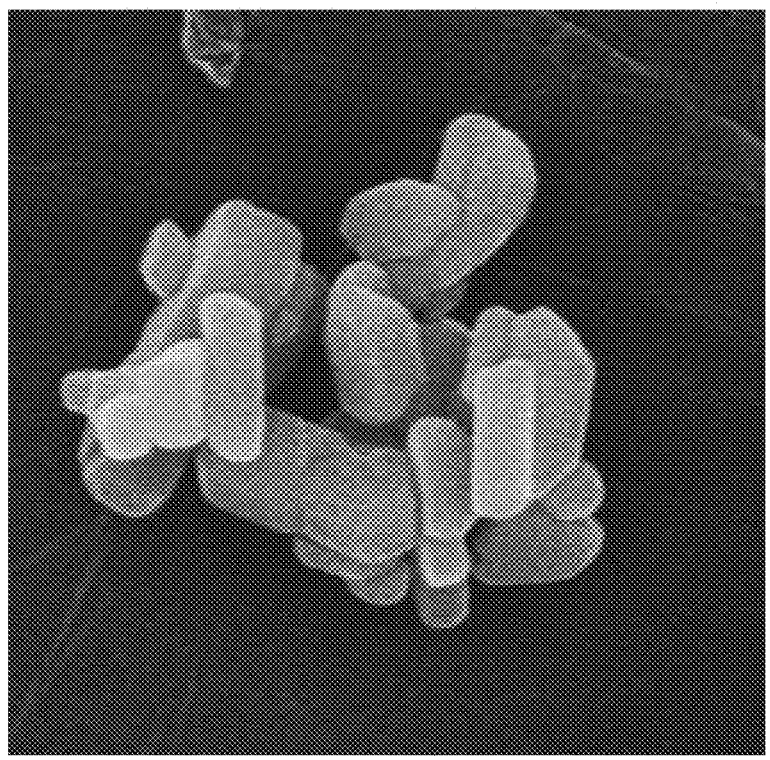
FIG. 8 shows a SEM image of particles of lithium iron phosphate.

$LiFePO_4$ obtained in the above manner was observed with a scanning electron microscope (SEM) (see FIG. 8). As a result, substantially rectangular-solid crystal particles of $LiFePO_4$ roughly with a size of (50 nm to 200 nm, 50 nm to 200 nm, 50 nm to 400 nm) were observed.

It can be seen that $LiFePO_4$ with a small particle size can be obtained by the method described in this example.

EXPLANATION OF REFERENCE

S101: step, S102: step, S103: step, S104: step, S105: step, S106: step, S107: step, S201: step, S202: step, S203: step, S204: step, S301: step, S302: step, S303: step, 400: positive electrode current collector, 401: positive electrode active material layer, 402: positive electrode, 405: positive electrode current collector, 406: negative electrode active material layer, 407: negative electrode, 410: separator, 411: electrolyte solution, 420: housing, 421: first electrode, 422: second electrode, 510: portable information terminal, 511: housing, 512: display portion, 513: operation button, 514: external connection port, 515: speaker, 516: microphone, 517: operation button, 530: portable information terminal, 531: first housing, 532: hinge, 533: second housing, 535: first display portion, 537: second display portion, 539: operation button, 541: speaker, 543: power switch, 550: electric vehicle, 551: lithium ion battery, 553: control circuit, 555: computer, 557: driving device, 1100a: negative electrode, 1100b: negative electrode, 1101: substrate, 1103: conductive layer, 1105: mixed layer, 1107a: region, 1107b: region, 1108: negative electrode active material, 1109: core, 1109a: core, 1109b: core, 1109c: core, 1111: outer shell, 1111a: outer shell, 1111b: outer shell, 1111c: outer shell, and 1113: conductive layer.

This application is based on Japanese Patent Application serial no. 2011-186340 filed with Japan Patent Office on Aug. 29, 2011, the entire contents of which are hereby incorporated by reference.

What is claimed is:

1. A method of manufacturing an active material particle, comprising the steps of:
    preparing a first mixed solution comprising lithium and oxygen;
    preparing a second mixed solution comprising a metal and oxygen; and
    obtaining a particle of a compound comprising lithium, the metal and oxygen by mixing together the first mixed solution and the second mixed solution,
    wherein each of the first mixed solution and the second mixed solution comprises graphene oxide.

2. The method of manufacturing an active material particle according to claim 1,
    wherein the metal is one of iron, manganese, cobalt and nickel.

3. The method of manufacturing an active material particle according to claim 1, wherein the first mixed solution comprises a phosphoric acid.

4. The method of manufacturing an active material particle according to claim 1, wherein the first mixed solution comprises silicon.

5. The method of manufacturing an active material particle according to claim 1,
    wherein the particle is obtained by subjecting the second mixed solution to a heat treatment in
    an atmosphere of 0.1 MPa to 4.0 MPa.

6. The method of manufacturing an active material particle according to claim 1, wherein the compound has a size of 30 nm to 250 nm.

7. The method of manufacturing an active material particle according to claim 1, wherein the particle comprises iron.

8. The method of manufacturing an active material particle according to claim 1, wherein the particle comprises manganese.

9. The method of manufacturing an active material particle according to claim 1, wherein the particle comprises cobalt.

10. The method of manufacturing an active material particle according to claim 1, wherein the particle comprises nickel.

11. The method of manufacturing an active material particle according to claim 1, further comprising the step of:
    performing a heat treatment of the particle.

12. The method of manufacturing an active material particle according to claim 11, wherein the heat treatment is a drying treatment.

13. The method of manufacturing an active material particle according to claim 3, wherein the particle comprises any one of $LiNiPO_4$, $LiCoPO_4$, $LiMnPO_4$ and $LiFePO_4$.

14. The method of manufacturing an active material particle according to claim 4, wherein the particle comprises at least any one of $Li_2MnSiO_4$ and $Li_2FeSiO_4$.

15. The method of manufacturing an active material particle according to claim 5, wherein the particle comprises graphene oxide.

16. A method of manufacturing an active material particle, comprising the steps of:
    preparing a first mixed solution comprising lithium and oxygen;
    preparing a second mixed solution comprising a metal and oxygen; and
    obtaining a particle of a compound comprising lithium, the metal and oxygen by mixing together the first mixed solution and the second mixed solution,
    wherein each of the first mixed solution and the second mixed solution comprises graphene oxide, and
    wherein the particle is obtained by subjecting the second mixed solution to a heat treatment in an atmosphere of 0.1 MPa to 4.0 MPa.

17. A method of manufacturing an active material particle, comprising the steps of:
    preparing a first mixed solution comprising lithium and oxygen;
    preparing a second mixed solution comprising a metal and oxygen; and
    obtaining a particle of a compound comprising lithium, the metal and oxygen by mixing together the first mixed solution and the second mixed solution,
    wherein each of the first mixed solution and the second mixed solution comprises graphene oxide,
    wherein the first mixed solution comprises a phosphoric acid,
    wherein the particle comprises any one of $LiNiPO_4$, $LiCoPO_4$, $LiMnPO_4$ and $LiFePO_4$, and
    wherein the particle is obtained by subjecting the second mixed solution to a heat treatment in an atmosphere of 0.1 MPa to 4.0 MPa.

18. A method of manufacturing an active material particle, comprising the steps of:
    preparing a first mixed solution comprising lithium and oxygen;
    preparing a second mixed solution comprising a metal and oxygen; and
    obtaining a particle of a compound comprising lithium, the metal and oxygen by mixing together the first mixed solution and the second mixed solution,
    wherein each of the first mixed solution and the second mixed solution comprises graphene oxide,
    wherein the first mixed solution comprises silicon,
    wherein the particle comprises at least any one of $Li_2MnSiO_4$ and $Li_2FeSiO_4$, and
    wherein the particle is obtained by subjecting the second mixed solution to a heat treatment in an atmosphere of 0.1 MPa to 4.0 MPa.

* * * * *